Patented Sept. 14, 1954

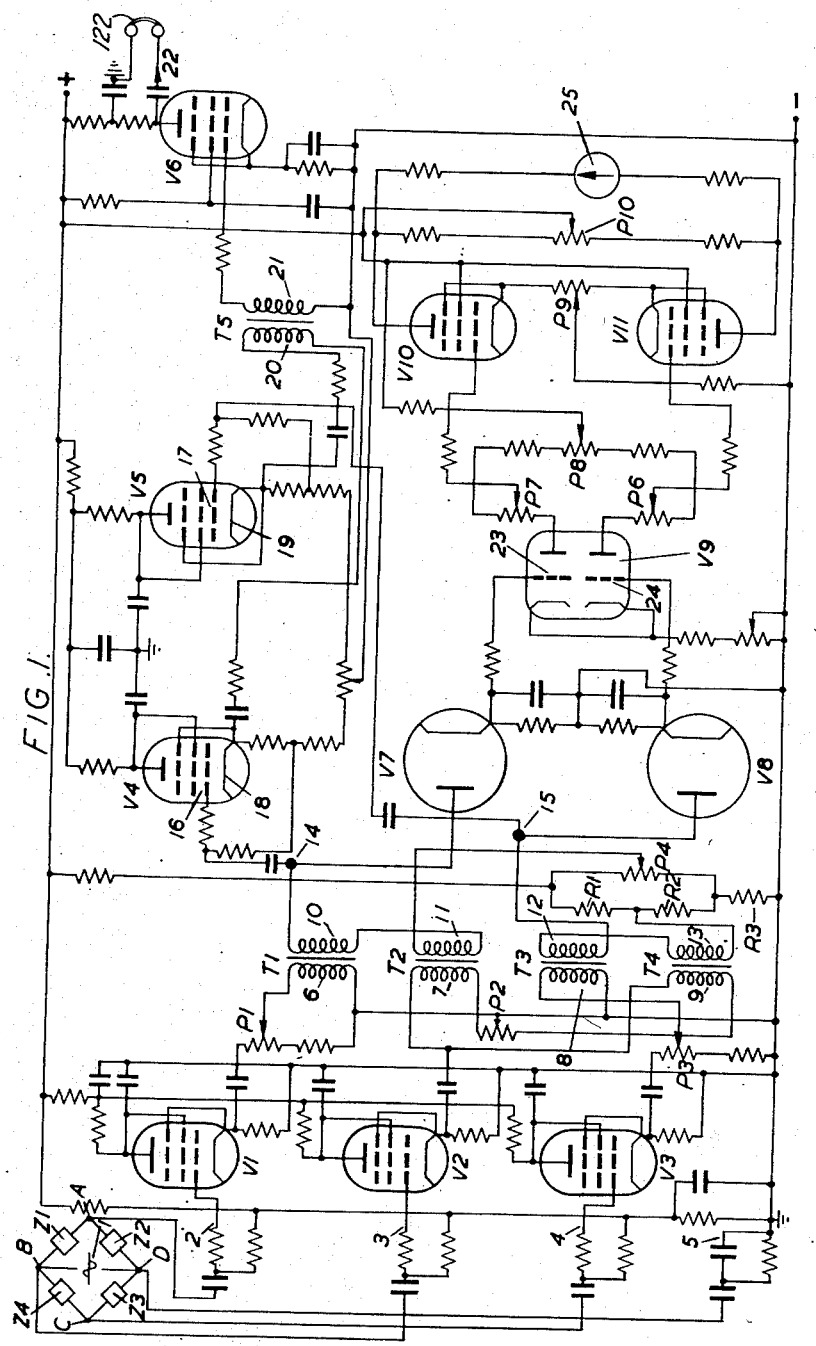

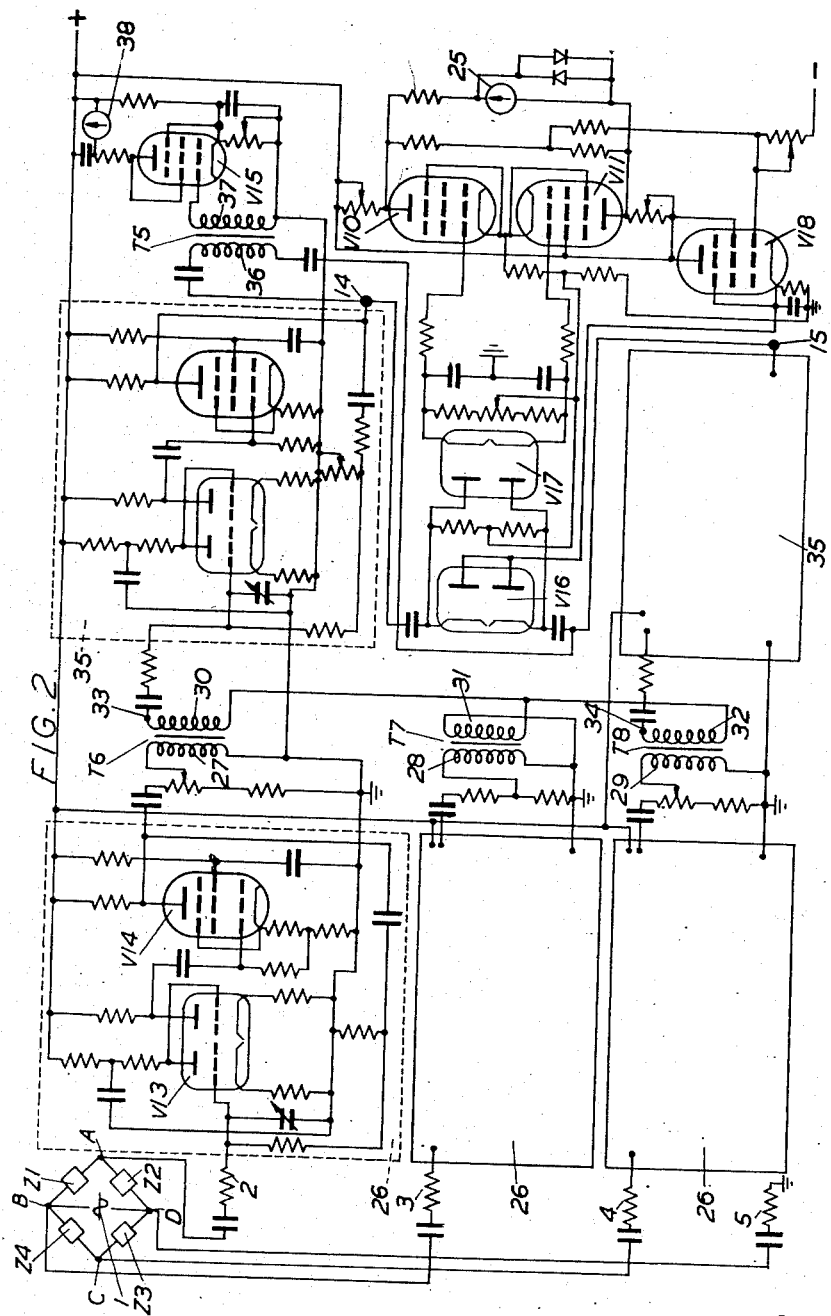

2,689,334

UNITED STATES PATENT OFFICE 2,689,334

MEANS FOR INDICATING CONDITIONS OF BALANCE AND UNBALANCE IN AN ELECTRIC BRIDGE NETWORK

Anthony Herbert Coppard, Hornchurch, Lister Hallas, Romford, George Harry King, Ilford, and Edward Searles, Plumstead, London, England, assignors to Southern United Telephone Cables Limited, Dagenham Dock, England, a British company Application April 16, 1953, Serial No. 349,278

Claims priority, application Great Britain April 16, 1952

10 Claims. (Cl. 324—57)

This invention relates to a circuit arrangement for indicating deviation from and the attainment of balance in a four-arm alternating current bridge network. It applies particularly to cases where the bridge, by reason of its construction and the characteristics of the impedances to be dealt with, is not directly connected at any point to ground (or other place of reference potential) but has a certain relation thereto which should not be disturbed by connections established for the present purpose.

The indication of deviation and balance here referred to is produced by apparatus which shows the result on an instrument or by a signal and/or by operating a relay, or relays, to control the adjustment of the bridge and automatically bring it to balance. Such apparatus generally provides for the making of a comparison by means (which may include an amplifier) which it is impracticable to isolate from ground. In accordance with the present invention an arrangement is produced in which the bridge and the indicating apparatus are associated in an operative combination while complying with the condition that the internal and external electric potential relationships of the bridge should not be disturbed.

The four terminals of the bridge (i. e. the junction points between the four impedances in the bridge) will be referred to for convenience by the letters A, B, C and D, B and D being located at the ends of the input diagonal and A and C at the ends of the detection diagonal.

The criterion of balance employed is that the voltage across the impedance between the points A and B shall be equal in amplitude and phase to the voltage across the impedance between B and C. The procedure for applying this criterion is to obtain the voltage to ground at each end of one of these impedances, say at the points A and B, and to subtract one from the other, both in amplitude and phase, and to compare this resultant voltage with the resultant voltage similarly obtained from the other impedance, that is from the voltages at the points B and C.

To carry out this process the voltages from the four corners of the bridge are applied to four impedances preferably high compared with the bridge impedance and identical in value. Three of these, associated with the points A, B and C, are for the purpose of making the comparison and the fourth to the point D is for the purpose of maintaining the relation of the bridge to ground. From the first three impedances the voltages are applied to the primaries of a group of transformers, the secondaries of which are connected in pairs so as to effect the subtraction for the two groups of voltages A, B and B, C. These impedances may be impedance changing devices of the cathode follower type or amplifiers designed to present relatively high input impedance and relatively low output impedance. The transformers may be a group of three or four.

The two voltages resulting from the subtractions have then to be compared in magnitude and phase and the bridge adjusted until equality in each respect is attained. This comparison may be made by an alternating current method of detection, for instance by telephones or other indicators, until a null or minimum effect is obtained. We prefer to use for this comparison a pair of balanced tube amplifiers to which the voltages are fed, the connections being such that when these two voltages are balanced in phase and magnitude the output is zero, while in a state of unbalance the output is proportional to the difference between the two input voltages. The balanced tube amplifiers may include tubes of high input impedance with cathode coupled outputs, and the output may be applied through a transformer to an amplifying tube and thence to telephones or other indicators.

When it is known that the voltages to be compared differ only in magnitude another type of indicating arrangement can be used. In this, the two resultant voltages from the transformer secondary winding groups are rectified, with or without prior amplification, and passed to a balanced direct current amplifier. From the output of this a current proportionate to the difference between the two voltages is applied to a device, for instance a zero-centre instrument, which will indicate the sense and magnitude of the deviation from balance. Alternatively, or in addition, the output may be applied to a three-position relay by means of which automatic gear adjusting the bridge may be controlled.

Provision for both methods of comparison in one apparatus may be advantageous since in some classes of testing to which the invention is applicable, for instance the testing of a large number of quads of a communication cable, it is known that the power factors of all or a large number of the impedances to be tested have substantially the same value so that the bridge may be adjusted for this with one of the impedances by the use of the alternating current indicating circuit and then may be left set for the other impedances for which balance can be obtained by the use of the direct current part of the apparatus.

Provision may be made in known manner for adjustable settings of grid potentiometers and other devices for correcting any slight inequalities in the tubes, transformers, or other parts of the apparatus which take part in the comparisons of voltage so that these comparisons may not be disturbed by such irregularities.

The invention is described in more detail hereinafter by way of example and with reference to the accompanying drawings, wherein:

Figure 1 is a circuit diagram of one arrangement incorporating the invention; and Figure 2 is a circuit diagram of another arrangement incorporating the invention.

In the arrangement shown in Figure 1 the conditions of balance and unbalance are to be indicated in an impedance bridge comprising four impedance arms Z1–Z4 arranged between the four corners A, B, C and D. The alternating current input to the bridge is applied across the diagonal BD from a source 1 and the output is taken across the detection diagonal AC. To carry out the process of the invention the voltages from the four corners of the bridge are applied to four impedances 2–5 which are of identical value and are high compared with the bridge impedances. Three of these impedances 2, 3 and 4 are associated with the points A, B, and C respectively and are for the purpose of making the required voltage comparison. The fourth impedance 5 is associated with the point D for the purpose of maintaining the relation of the bridge to ground. Each of the impedances 2, 3, and 4 include impedance changing devices comprising tubes V1, V2 and V3 connected as cathode followers. The output connections from the cathode follower tubes V1, V2 and V3 are applied to the primary windings of four transformers T1–T4 and the secondary windings are connected in pairs to effect subtraction for the two groups of voltages A, B and B, C. As will be seen from the figure the voltage from A is applied to the primary winding 6 of transformer T1, the voltage from B is applied to the parallel connected primary windings 7 and 9 of transformers T2 and T4; and the voltage from C is applied to the primary winding 8 of transformer T3. The secondary windings 10 and 11 of transformers T1 and T2 are connected in series opposition so that the voltage at the output terminal 14 represents a subtraction of the voltage conditions A and B. Similarly the secondary windings 12 and 13 of the transformers T3 and T4 are connected in series opposition so that at the output terminal 15 there is obtained a voltage representing the subtraction of the voltage conditions B and C. Variable potentiometers P1, P2 and P3 provide for balancing out inequalities of the transformer characteristics and of the gains of the cathode followers.

The output voltages at the terminals 14 and 15 have now to be compared in magnitude and phase, and the bridge will be adjusted until equality in each respect is obtained. Two circuits are connected to these terminals 14 and 15, one for comparing the voltages in magnitude and phase and the other for comparing them in magnitude alone. The first circuit to be described is the one for comparing the voltages in phase and magnitude, using an alternating current method of detection. The circuit comprises a pair of balanced amplifying tubes V4 and V5. The control grid 16 of tube V4 receives the voltage from terminal 14 and the control grid 17 of the other tube V5 receives the voltage from the other terminal 15. The output from these tubes is taken from the cathodes 18 and 19 respectively, one to each terminal of the primary winding 20 of a transformer T5. The output from the secondary winding 21 of this transformer T5 is amplified by a tube V6 and the resulting signal in the anode circuit of this tube is detected at the terminal 22. It will be apparent that when the voltages are equal in phase and magnitude there will be no output, or a minimum output, at the terminal 22 and this condition is readily detectable in the usual way by means of telephones 122 or other indicators of a null or minimum effect.

The other circuit connected to the terminals 14 and 15 compares only differences in the magnitude of the voltages and can be used when it is known that the voltages are in phase. In this case the output voltages from terminals 14 and 15 are rectified by the diode tubes V7 and V8, terminal 14 being connected to the anode of tube V7 and terminal 15 being connected to the anode of the other tube V8. The network of resistances R1–R3 and variable potentiometer P4 provide for balancing out inequalities in the voltages developed across the diodes V7 and V8 due to thermal emission. The rectified signals are passed to a double direct current amplifier tube V9, the output from one rectifier going to the grid 23 and the output from the other rectifier going to the grid 24. The amplified voltages are then applied to two balanced amplifier tubes V10 and V11, the output from one anode of V9 being taken to the grid of V10 and from the other anode of V9 to the grid of V11. The outputs from the anodes of V10 and V11 are then applied in opposition to a zero-centre instrument 25 which will indicate the sine and magnitude of the deviation of the bridge from balance. Alternatively or in addition this output may be applied to a three position relay by means of which automatic gear adjusting the bridge may be controlled. Such an arrangement is described in the specification of U. S. patent application Serial No. 346,316.

Variable potentiometers P6–P10 are used to balance the direct current amplifier over a considerable change of input level so that the apparatus is not sensitive to changes of source amplitude but only to differential change of the input signal.

Where the bridge is used only for direct current testing the ends of the detection diagonal AC can be connected directly to the input of the direct current amplifier, that is to the grids 23 and 24 of the double tube V9.

Figure 2 shows a modified arrangement which has been found to provide a maximum degree of balance with freedom from drift. In this case the three cathode followers V1–V3 have each been replaced by a two-stage amplifier 26 comprising a double input tube V13 and an output tube V14. Each amplifier is designed to have greatly increased overall negative feed-back to maintain the gain constant in both amplitude and phase, with a reasonably high input impedance and low output impedance, and an overall gain of unity. For reasons described hereinafter it is possible in this case to reduce the recombining transformers to three, namely T6, T7 and T8. The primary windings 27, 28 and 29 are fed with voltages corresponding to points A, B and C of the bridge respectively. The secondary windings 30, 31 and 32 are so connected that at one output terminal 33 there is obtained a voltage representing the subtraction of the voltages at A and B and at the other terminal 34 a voltage representing the subtraction of the voltages at point B and C. The output from each of these terminals 33 and 34 is fed to a buffer amplifier 35. Each buffer amplifier is generally similar to the amplifier 26, the output impedance being low and the gain particularly constant. It is convenient to design each amplifier 35 to have a gain of five. The reduction of the recombining transformers from four to three is possible because of these buffer amplifiers placed between the transformers and the rectifiers in the magnitude detecting circuit because the impedance presented by the amplifiers to the transformers is constant and of a high value.

The output terminals from the buffer amplifiers 35 correspond with the terminals 14 and 15 of Figure 1 and are marked accordingly. With the low output impedance of the amplifiers 35, high impedance cathode follower inputs to the phase detection circuit are no longer necessary. The primary winding 36 of the final transformer T5 is therefore connected directly across the output terminals 14 and 15. The alternating current output from the secondary winding 37 is rectified and applied to any convenient form of zero-centre indicator 38. Conveniently the rectification is carried out by means of a tube V15 arranged to operate as a detector of the anode bend type. Alternatively the output from the transformer T5 may be monitored by means of head-phones connected across the secondary winding 37.

For magnitude indication alone the output terminals 14 and 15 are connected to two double diode rectifiers V16 and V17 whereby an effective gain of two is obtained compared with the gain obtained with the single pair of diodes V7 and V8 in Figure 1. The extra gain obtained by the use of the buffer amplifiers 35 and the subsequent high level rectification permits the double direct current amplifier V9 of Figure 1 to be dispensed with and the rectified voltages are fed directly into the balanced output pair of tubes V10 and V11. The outputs from these tubes are taken from the anode circuits in opposition through a zero centre instrument 25 as before. Through a cathode follower tube V18 a fraction of the final mean direct current potential is taken from the anodes of the output tubes V10 and V11 to one of the double diode rectifiers V16. This is effected in such a manner that any supply change in the mean amplitude of the alternating current signal (such as may be caused by a change in the amplitude of the oscillator 1 feeding the bridge diagonal BD) is off-set by the feed-back signal. The mean potential of the grids of the output tubes V10 and V11 is thus kept more constant and an accurate balance preserved. By this arrangement the double diode V16 may thus be said to operate as a direct current clamp. It will be appreciated that this form of magnitude detector circuit is not suitable for use with a direct current bridge and in such a case the arrangement shown in Figure 1 is used.

As in the arrangement shown in Figure 1 adjustable potentiometers are used to balance out any irregularities in the tubes, transformers, and other circuit elements. There are classes of testing to which it is particularly advantageous to apply apparatus of the form which has been described, for instance in the testing of a large number of quads in a communication cable. In such a case it is known that the power factors of all or of a large number of the impedances to be tested have substantially the same value. The bridge may therefore be adjusted for this aspect of the test with one of the impedances to be measured by using that alternating current indicating circuit which deals with both phase and magnitude. This adjustment of the circuit can be retained for the other impedances for which balance can be obtained by the use of the direct current detector circuit responsive to magnitude only.

What we claim as our invention is:

1. In an electric circuit comprising an alternating current bridge network consisting of four impedance arms extending between corners A, B, C and D, with the input voltage terminals at B and D, means for comparing in magnitude and phase the algebraic differences between the voltages to ground at A and B and at B and C, said means comprising an impedance connected between D and ground, a group of transformers, impedances equal to said impedance connected between each of A, B and C and the primary windings of said transformers, the secondary windings of said transformers being interconnected in two groups, the output voltage from one group being proportional to the difference between the voltages at A and B, and the output voltage from the other group being proportional to the difference between the voltages at B and C, and means for applying the two output voltages from the transformers in series opposition to a null indicator.

2. In an electric circuit comprising an alternating current bridge network consisting of four impedance arms extending between corners A, B, C and D, with the input voltage terminals at B and D, means for comparing in magnitude and phase the algebraic differences between the voltages to ground at A and B and at B and C, said means comprising an impedance connected between D and ground, a group of transformers, impedances equal to said impedance connected between each of A, B and C and the primary windings of said transformers, the secondary windings of said transformers being interconnected in two groups, the output voltage from one group being proportional to the difference between the voltages at A and B, and the output voltage from the other group being proportional to the difference between the voltages at B and C, two balanced tube amplifiers, one connected to one output terminal of the transformers and the other connected to the other output terminal of the transformer, and connections from the amplifier output terminals feeding a null indicator in series opposition.

3. In an electric circuit comprising an alternating current bridge network consisting of four impedance arms extending between corners A, B, C and D, with the input voltage terminals at B and D, means for comparing in magnitude and phase the algebraic differences between the voltages to ground at A and B and at B and C, said means comprising an impedance connected between D and ground, a group of transformers, impedances equal to said impedance connected between each of A, B and C and the primary windings of said transformers, the secondary windings of said transformers being interconnected in two groups, the output voltage from one group being proportional to the difference between the voltages at A and B, and the output voltage from the other group being proportional to the difference between the voltages at B and C, an output transformer, connections in series opposition from the output terminals of the group of transformers to opposite ends of the primary winding of the output transformer, and a null indicator connected across the secondary winding of the output transformer.

4. In an electric circuit as claimed in claim 3, a tube amplifier connected between the output transformer and the null indicator.

5. In an electric circuit as claimed in claim 1, additional means for comparing in magnitude the output voltages from the transformer group, said additional means comprising rectifiers connected to each of the output terminals of the transformer group, said rectifiers providing two output voltages in opposition, two balanced amplifiers for said two output voltages, and a null indicator connected across the two output terminals of the balanced amplifiers.

6. In an electric circuit as claimed in claim 1, the provision between D and ground, and between A, B, C and the transformer group, of equal impedances having a relatively higher value than the impedances of the bridge arms.

7. In an electric circuit comprising an alternating current bridge network consisting of four impedance arms extending between corners A, B, C and D, with the input voltage terminals at B and D, means for comparing in magnitude and phase the algebraic differences between the voltages to ground at A and B and at B and C, said means comprising a high impedance connected between D and ground, four transformers, an impedance equal to the said high impedance connected between each of A, B and C and the primary windings of the transformers, the primary and secondary windings of the transformers being interconnected to give two secondary output voltages proportional to the said algebraic differences, and means for applying the said secondary output voltages in series opposition to a null indicator.

8. In an electric circuit comprising an alternating current bridge network consisting of four impedance arms extending between corners A, B, C and D, with the input voltage terminals at B and D, means for comparing in magnitude and phase the algebraic differences between the voltages to ground at A and B and at B and C, said means comprising a high impedance connected between D and ground, three transformers, an impedance equal to said high impedance connecting each of the corners A, B and C to one of the primary windings of the three transformers, interconnections between the secondary windings of said transformers to give two secondary output voltages proportional to the said algebraic differences, and means for applying the said secondary output voltages in series opposition to a null indicator.

9. In an electric circuit comprising an alternating current bridge network consisting of four impedance arms extending between corners A, B, C and D, with the input voltage terminals at B and D, means for comparing in magnitude and phase the algebraic differences between the voltages to ground at A and B and B and C, said means comprising a high impedance connected between D and ground, a group of transformers, cathode follower tubes each connecting one of the corners A, B and C to the primary windings of said transformers, each cathode follower presenting an impedance equal in value to the said high impedance, the secondary windings of the transformers being interconnected to give two secondary output voltages proportional to the said algebraic differences, and means for applying the said secondary output voltages in series opposition to a null indicator.

10. In an electric circuit comprising an alternating current bridge network consisting of four impedance arms extending between corners A, B, C and D, with the input voltage terminals at B and D, means for comparing in magnitude and phase the algebraic differences between the voltages to ground at A and B and at B and C, said means comprising a high impedance connected between D and ground, a group of transformers, tube amplifiers each connecting one of the corners A, B and C to the primary windings of said transformers, each amplifier having a high input impedance and a low output impedance and presenting to the bridge an impedance equal to the first mentioned high impedance, the secondary windings of the transformers being interconnected to give two secondary output voltages proportional to the said algebraic differences, and means for applying the said secondary output voltages in series opposition to a null indicator.

References Cited in the file of this patent

UNITED STATES PATENTS

| Number | Name | Date |
|---|---|---|
| 2,564,390 | Blumlein | Aug. 14, 1951 |
| 2,611,005 | Wilson | Sept. 16, 1952 |